(No Model.) 6 Sheets—Sheet 1.

J. ROTH & M. DE TAMBEL.
CRACKER MACHINE.

No. 302,868. Patented July 29, 1884.

Witnesses
Frank J. Blanchard
Adam Geo. White

Inventor:
Jacob Roth
Martin de Tambel
By Wm. H. Lotz
Attorney.

N. PETERS. Photo-Lithographer, Washington, D. C.

(No Model.) 6 Sheets—Sheet 2.
J. ROTH & M. DE TAMBEL.
CRACKER MACHINE.
No. 302,868. Patented July 29, 1884.
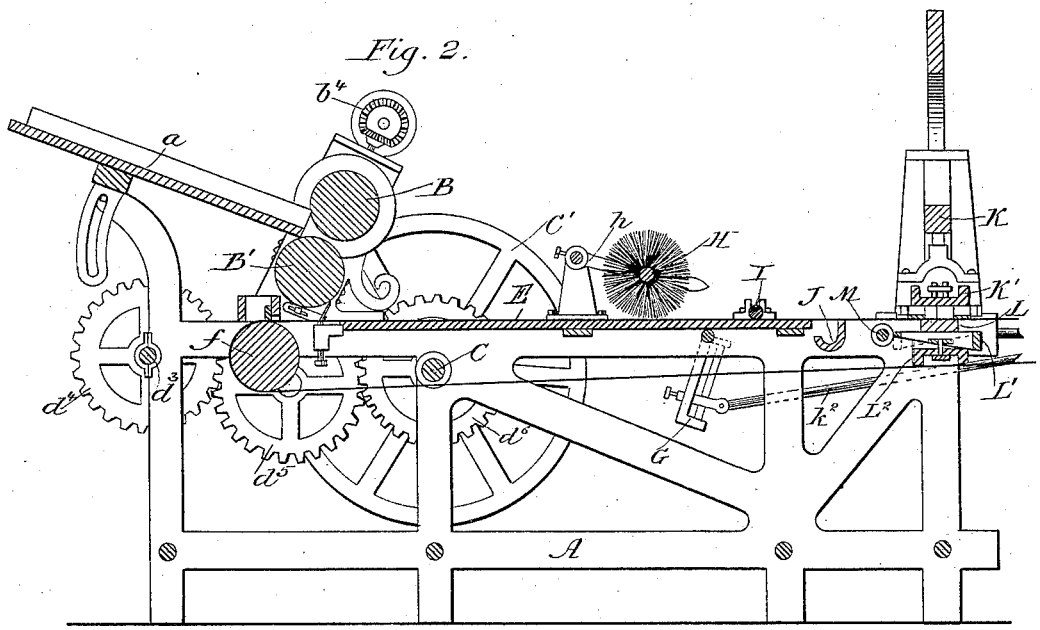
Fig. 2.
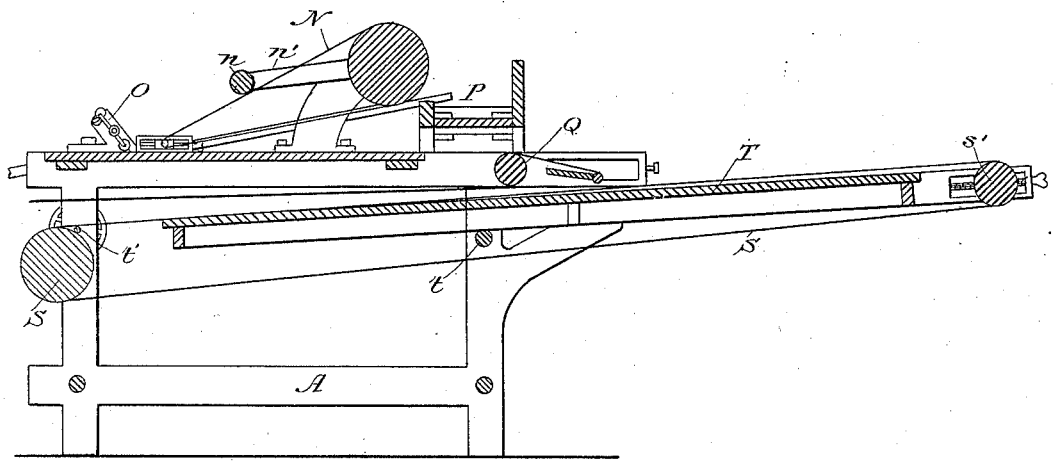
Witnesses:
Frank S. Blanchard
Adam Geo. White
Inventor:
Jacob Roth
Martin De Tambel
By Wm. H. Lotz
Attorney (No Model.) 6 Sheets—Sheet 3.
J. ROTH & M. DE TAMBEL.
CRACKER MACHINE.
No. 302,868. Patented July 29, 1884.
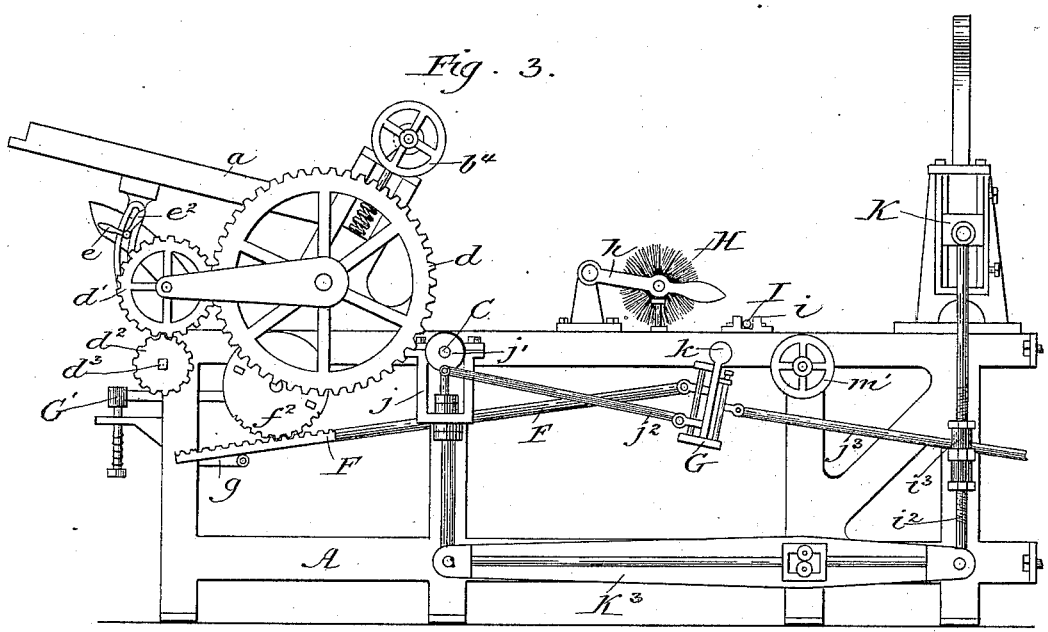
Fig. 3.
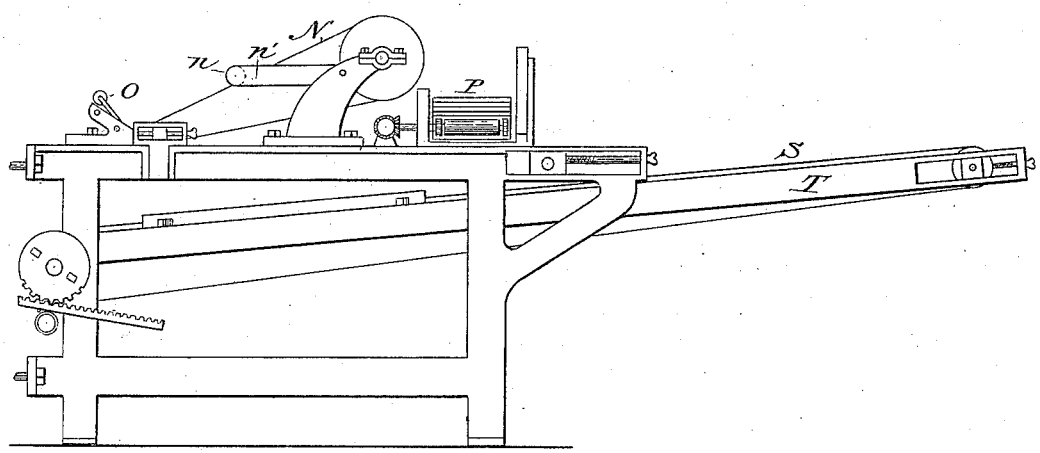
Witnesses:
Frank J. Blanchard
Adam Geo. White
Inventor.
Jacob Roth
Martin De Tambel
By Wm H Lotz
Attorney.

(No Model.) 6 Sheets—Sheet 4.
J. ROTH & M. DE TAMBEL.
CRACKER MACHINE.
No. 302,868. Patented July 29, 1884.
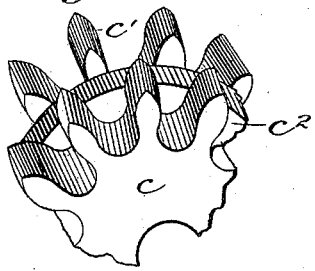
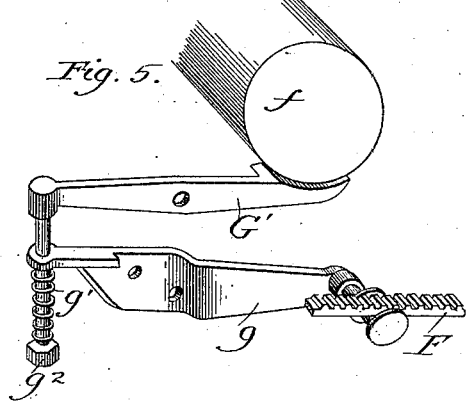
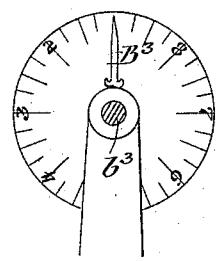
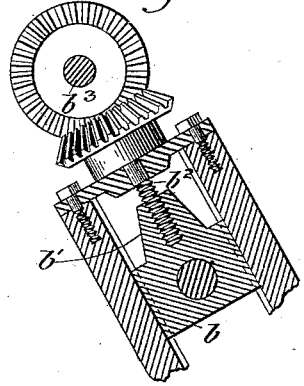
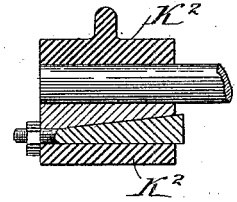
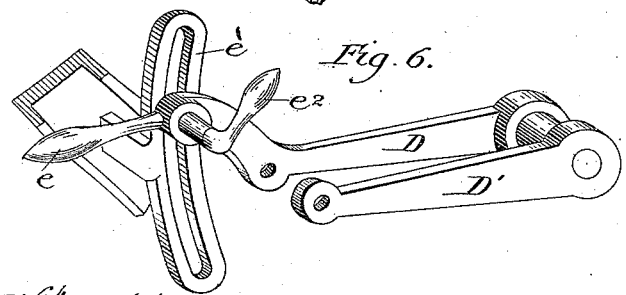
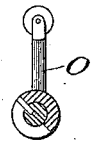
Witnesses:
Frank J. Blanchard
Adam Pro. White
Inventor:
Jacob Roth
Martin De Tambel
By Wm H Lotz
Attorney.

(No Model.) 6 Sheets—Sheet 5.
J. ROTH & M. DE TAMBEL.
CRACKER MACHINE.
No. 302,868. Patented July 29, 1884.
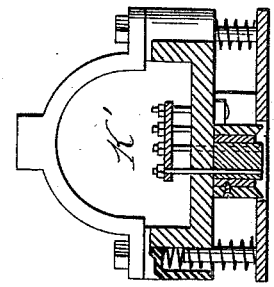
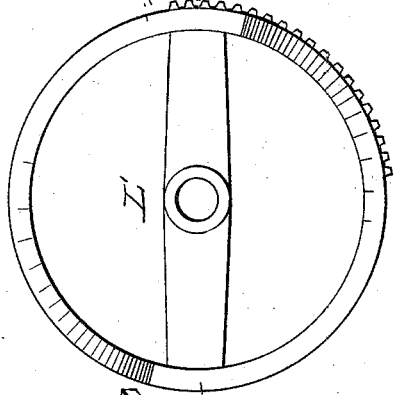
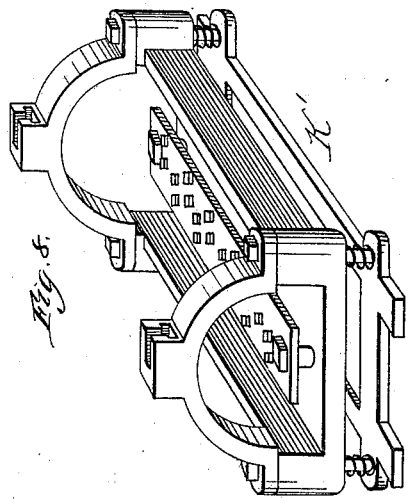
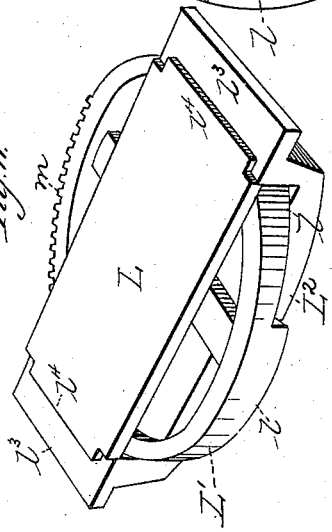
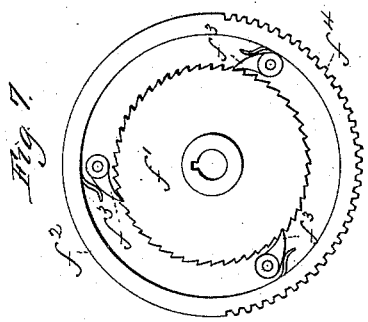
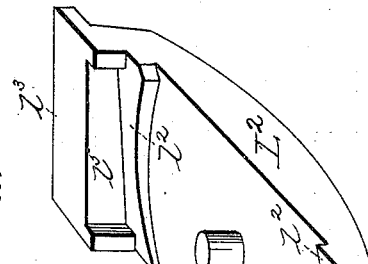
WITNESSES
F. B. Townsend
F. W. Kaschagen
INVENTORS
Jacob Roth,
Martin De Tambel,
By Lotz & Dyer
Attys.

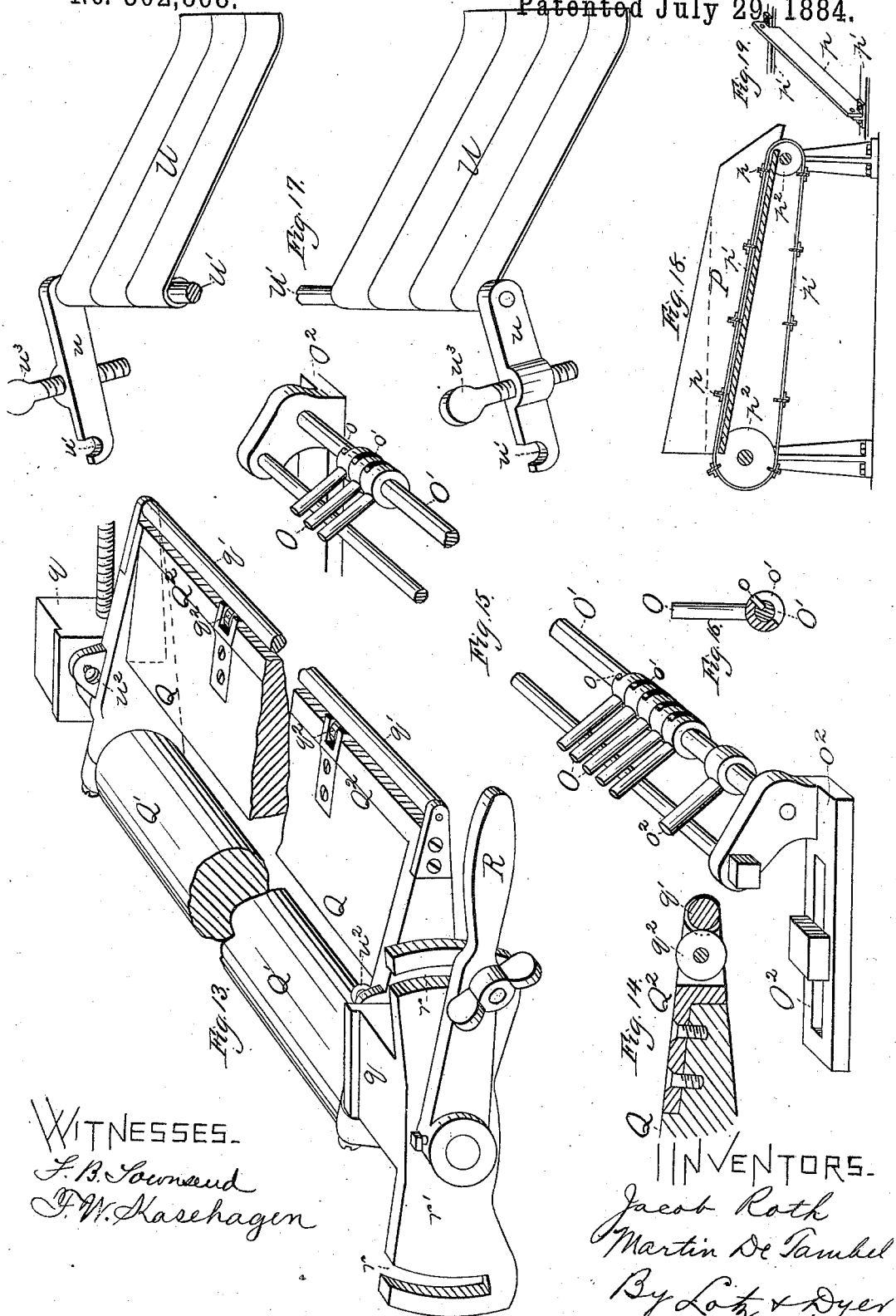

UNITED STATES PATENT OFFICE.

JACOB ROTH AND MARTIN DE TAMBEL, OF CHICAGO, ILLINOIS, ASSIGNORS TO ROTH, McMAHON & CO., OF SAME PLACE.

CRACKER-MACHINE.

SPECIFICATION forming part of Letters Patent No. 302,868, dated July 29, 1884.

Application filed November 19, 1880. (No model.)

*To all whom it may concern:*

Be it known that we, JACOB ROTH and MARTIN DE TAMBEL, of Chicago, in the county of Cook and State of Illinois, have invented a certain new and useful Improvement in Cracker-Machines, of which the following is a specification.

The object we have in view is to produce a cracker-machine which can be readily converted at pleasure into a pan or peeling machine by a simple change of parts, and which will be so improved in details of construction from former cracker-machines that it will be more efficient and convenient in operation and can be accurately and readily adjusted.

Our invention consists in the various novel devices and combinations of devices employed by us, as fully hereinafter explained, and pointed out by the claims.

Figure 1:
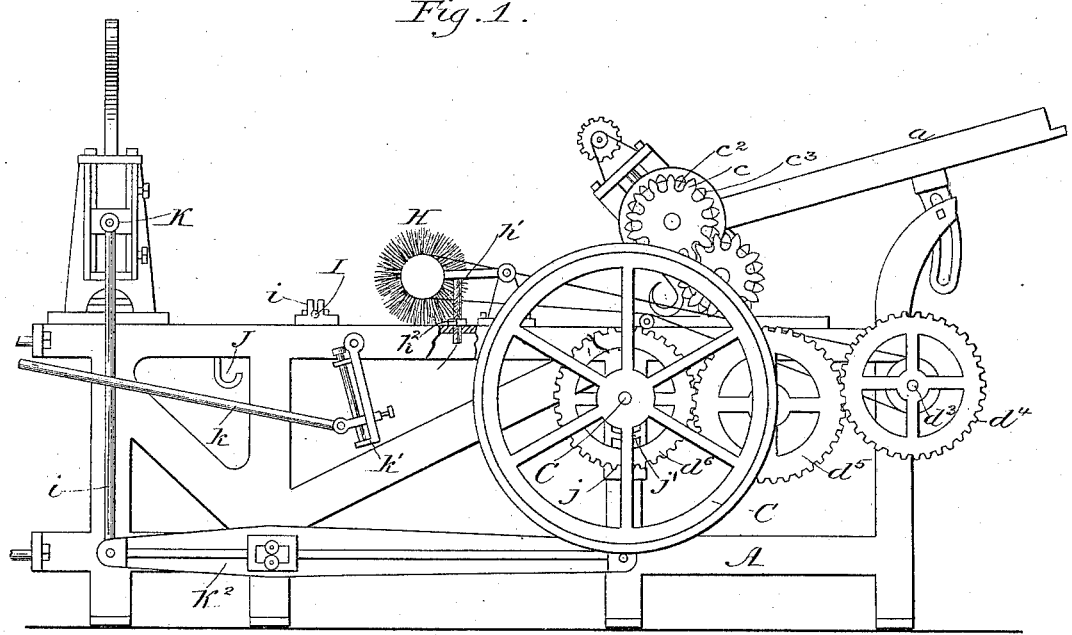
Figure 1:
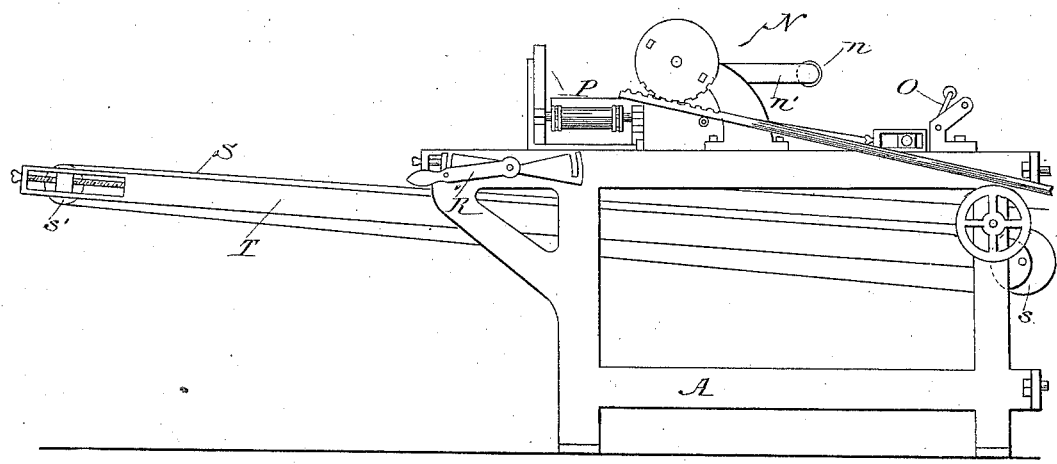

In the accompanying drawings, forming a part hereof, Figure 1 represents a side elevation, in two sections, of the machine; Fig. 2, a longitudinal vertical section, in two sections, of the same, and Fig. 3 an elevation, in two sections, from the side opposite to that shown in Fig. 1; Fig. $3^x$, a separate view of one of the double finger-gears; Fig. 4, a sectional view through one of the boxes of the adjustable dough-roller; Fig. $4^x$, a separate view of the dial-plate and indicating-finger; Fig. 5, a perspective view of the apron-brake. Fig. $5^x$ represents a detail sectional view of the horizontal lever $K^2$; Fig. 6, a perspective view of the arms that carry the adjustable cog-wheel and their locking device. Fig. $6^x$ represents in detail one of the fingers for forcing the crackers out of the scrap; Fig. 7, an elevation of the pawl-and-ratchet connection for driving the main apron; Figs. 8 and 9, views of the cutter-frame; Fig. 10, a perspective view of the supporting-plate; Fig. 11, a view of the supporting-plate, the turn-table, and the bed-plate fitted together; Fig. 12, a bottom view of the turn-table; Fig. 13, a perspective view of the combined apron-wedge and roller; Fig. 14, a sectional view of the wedge side of the same; Fig. 15, a perspective view of the separating-fingers and their operating-bar; Fig. 16, a cross-section of the bar that supports the fingers, taken through the hub of one of the fingers; Fig. 17, a perspective view of the fingers that prevent the turning of the crackers in passing from the main apron into the pans; Fig. 18, a longitudinal section of the inclined trough and traveling scrapers for delivering the scrap at the side of the machine, and Fig. 19 a perspective view of one of the scrapers.

Like letters denote corresponding parts in all the figures.

A is the main frame, which is made separable behind the cutting-frame, so that the machine can be shipped in two parts.

At the head of the machine, in suitable standards, are journaled the dough or pressure rollers B B′, to which the dough is fed by an inclined table or hopper, $a$, supported so that its inclination can be changed as desired. The lower dough-roller, B′, which is connected by gearing with the driving-wheel, turns in stationary boxes, while the upper roller, B, is mounted in sliding boxes $b$, having screw-sleeves $b'$, in which work screws $b^2$, Fig. 4. These screws are turned, through bevel-gears, by a horizontal shaft, $b^3$, operated by a hand-wheel, $b^4$. By turning the hand-wheel the upper dough-roller can be adjusted toward or away from the lower roller, to give the sheet of dough the desired thickness. A dial-plate, $B^2$, Fig. $4^x$, is secured to the back of the bevel-gear on the shaft $b^3$, nearest the hand-wheel $b^4$, and an indicating-finger, $B^3$, is secured to the journal-box of such shaft. The dial $B^2$ is divided off into eight main divisions, which are numbered, and each of these main divisions is preferably subdivided into four parts. One revolution of the shaft $b^3$ separates the dough-rollers one-eighth of an inch, which is the greatest usual separation, and each of the main divisions of the dial-plate represents a separation of one sixty-fourth of an inch, and the subdivisions proportionately smaller distances. By having the dial-plate and indicating-finger, the baker is enabled to adjust the dough-rollers accurately with but little trouble. It is evident that the parts could be reversed and the dial-plate be fixed stationary, while the finger could be made to revolve. The shafts of the dough-rollers are geared together at one end by the double finger-gears.

(Shown in Figs. 1 and 3$^x$.) Each of these gears is composed of two finger gear-wheels, $c$ $c'$, cast solid with a plate, $c^2$, which separates them. The teeth of the gear-wheels $c$ are arranged to alternate with the teeth of the wheel $c'$—that is to say, the teeth of one wheel are located opposite the spaces between the teeth of the other wheel.

On account of the adjustment of the upper dough-roller, the teeth of the connecting-gears have to be long enough to admit of that adjustment without uncoupling the gears, and for strength they must be made large and broad. This requirement, when single finger gear-wheels are used, causes an unevenness of movement of the two rollers and wears the teeth by the dragging of the teeth upon each other, which objections, however, are obviated by the double finger-gears employed by us, such gears having great strength, and at the same time producing the movement of a single gear with the same number of teeth as the double gear and with less noise and friction.

On the other side of the machine the shaft of the lower dough-roller, B', is provided with a cog-wheel, $d$. This meshes with an adjustable gear-wheel, $d'$, which rests on a gear-wheel, $d^2$, removably secured to the end of a shaft, $d^3$, which extends across the frame of the machine. This cross-shaft $d^3$, at its other end, is connected by gear-wheels $d^4$ $d^5$ $d^6$ with the driving-shaft C, which carries the driving-pulley C', connected with the power. The adjustable gear-wheel $d'$ is mounted on a spindle journaled in arms D D', Fig. 6, which are sleeved on the shaft of the lower dough-roller, one on each side of the cog-wheel $d$. These arms swing freely on the roller-shaft. The arm D is extended beyond the gear-wheel $d'$ and terminates in a handle, $e$, by which such arms are moved. The arms are locked to a slotted plate $e'$, by means of a bolt turned by a handle, $e^2$. By turning the handle $e^2$, so as to loosen the lock, the adjustable gear can be raised by the handle $e$, and locked in an elevated position, and a larger or smaller gear can be then substituted for the wheel $d^2$, when, by dropping the adjustable gear down and locking it in position, the parts will again be in operative connection. In this manner the speed of the dough-rollers can be changed as desired. By mounting the adjustable gear in swinging arms, it can be handled much more conveniently than when the stud of the gear is adjustably secured in a curved slot, as heretofore.

E is main apron, which takes the sheet of dough pressed out by the rollers and carries it forward to the cutters. This apron, at the head of the machine, passes around a roller, $f$, by which it is driven. The shaft of the roller $f$ carries on one end a ratchet-wheel, $f'$, secured to such shaft, which is surrounded by a shell, $f^2$, sleeved on such shaft, and having pawl $f^3$, which engage with the teeth of the wheel $f'$. The shell $f^2$ has cog-teeth $f^4$ cut on a portion of its periphery, with which teeth engage the teeth on the end of a reciprocating rack-bar, F. This rack-bar is operated by an oscillating block, G, to which it is adjustably secured in the well-known manner, so that the extent of its movement can be changed. The toothed end of the rack-bar is supported in contact with the shell $f^2$ by an anti-friction-roller projecting from a plate, $g$, secured to the frame of the machine.

Above the plate $g$ is pivoted to the frame a brake-lever, G', Fig. 5, which presses at one end against the apron-roller $f$. The pressure of this brake-lever on the apron-roller is regulated by a spiral spring, $g'$, which is compressed the desired extent by a nut, $g^2$, on the lower end of a rod projecting downwardly from the brake-lever through the plate $g$. The purpose of this brake is to prevent the travel of the main apron beyond the point to which it is moved by the reciprocating rack-rod, and thus to secure an even feed of the sheet of dough to the cutters.

H is the dressing-brush, which is revolved by a long belt-connection with the cross-shaft $d^3$ at the front end of the frame. The brush is mounted on swinging arms, $h$, one of which is provided with a handle for raising and lowering the brush. The brush is held down wholly by its own weight and the strain of the operating-belt. The vertical position of the brush is regulated by a screw-bolt, $h'$, Fig. 1, which turns in a screw-threaded hole cut in the top of the frame A, and is held at any point of adjustment by a jam-nut, $h^2$. Thus it will be seen that the dressing-brush is free to be lifted up, to allow the forward end of the dough-sheet to pass under it without the necessity of loosening any fastening device, and very simple and efficient means are provided for adjusting the height of this brush above the main apron.

Between the dressing-brush and the cutters is a loose holding-roller, I, arranged transversely across the main apron, and resting thereon with its entire weight. This roller is of small diameter, and is preferably constructed with a metal core covered with a rubber jacket having a smooth exterior, which does not mark the dough. The holding-roller I is retained in position by open bearings, $i$, secured to the side frames, so that such roller can accommodate itself to different thicknesses of the dough-sheets, and will roll on top of such sheets as they are moved forward by the main apron. The purpose of this roller is to hold the dough-sheet down upon the apron, so that it cannot draw up, the effect of which would be to destroy the even size of the crackers. A scraper, J, is situated beneath the upper portion of the main apron and between the holding-roller and the cutting-frame and scrapes the pieces of dough from the bottom of the apron before it passes upon the bed-plate. This scraper is in the form of an inclined spout, bent from sheet metal, one side of the spout being extended up to produce the scraper. The spout delivers the dough at the side of the machine clear of the frame.

K is the cross-head of the cutters, which reciprocates vertically in standards, as usual, and has removably secured to it the cutting-frame K', (shown in Figs. 8 and 9,) which is of the ordinary construction. The cross-head K is operated by vertical rods $i'$ $i^2$, connecting such cross-head with horizontal levers $K^2$ $K^3$, mounted on a cross-shaft on opposite sides of the machine, near the lower part of the frame. One of the rods $i'$ $i^2$ is made in two parts, the meeting ends of which are oppositely screw-threaded, and are connected by a sleeve, $i^3$, so that the rod can be lengthened or shortened in order to level the cross-head. The other ends of the levers $K^2$ $K^3$ are adjustably connected by arms $j$ with eccentrics $j'$ on the driving-shaft, one of such eccentrics being on the end of the driving-shaft, while the other is near the opposite end of the shaft, between the gear-wheel $d^6$ and the frame. The eccentrics on the driving-shaft, the long levers, and the connecting-arms and rods form exceedingly efficient means for operating the cutter cross-head, which means work evenly and with the minimum of friction, and can be accurately adjusted. One of the eccentrics $j'$ has a wrist-pin projecting from it, to which is secured a pitman, $j^2$, adjustably connected with the oscillating block G, for operating such block. The block G has another rod, $j^3$, projecting from it for working the pan-apron, which will be presently described. This oscillating block is secured to a cross-shaft, $k$, to the opposite end of which is secured another oscillating block, $k'$, having a single rod, $k^2$, adjustably connected therewith for operating the scrap-apron. The bed-plate L, which receives the pressure of the cutters, is made adjustable vertically to regulate the cut by peculiar means. This bed-plate rests upon the even upper surface of an annular turn-table, L', whose lower side is constructed to form two inclines, $l$. The turn-table is pivoted by a stud, $l'$, upon a supporting-plate, $L^2$, having inclines $l^2$ to receive the inclines $l$ of the turn-table, and hold the bed-plate level. The supporting-plate $L^2$ has flanges $l^3$, which rest upon springs of rubber supported by the frame, to form a yielding bed-plate. The ends of the bed-plate have tenons $l^4$, which move in mortises $l^5$ in the supporting-plate, for the purpose of retaining the bed-plate in position. A portion of the periphery of the annular turn-table L' is provided with teeth $m$, with which engages the worm on the center of a worm-shaft, M, Fig. 2, which is journaled transversely in the frame. This worm-shaft has a hand-wheel, $m'$, on one end, by turning which the turn-table will be moved and the bed-plate raised or lowered as desired. By these means the two moving inclines that adjust the bed-plate are forced to work alike, so that the bed-plate will always be kept level. The hand-wheel is also within convenient reach, and the adjustment can be readily made. The crackers and scrap are carried along from the cutters by the main apron until they reach the inclined scrap-apron N, which is of ordinary construction, and is fed by a pawl-and-ratchet connection with the rod $k^2$. A holding-roller, $n$, journaled in the ends of arms $n'$, which are pivoted on the shaft of the upper roller of the scrap-apron, rests upon such scrap-apron, for holding the scrap thereto against the strain of the fingers O, which force the crackers out of the scrap. These fingers O, Figs. 15 and 16, are arranged on a cross-bar, O', supported by plates $O^2$, which are slotted and are adjustably secured by bolts to the frame of the machine. The fingers are sleeved on the cross-bar, which is provided with pins $o$, working in slots $o'$ in the hubs of such fingers. The cross-bar O' is provided with a finger, $o^2$, rigidly connected therewith, by which it can be turned. Now, if the cross-bar is turned forward by throwing the operating-finger $o^2$ down, the required number of fingers O can be thrown down to expel the crackers from the scrap, and when the cross-bar is turned in the opposite direction, the pins $o$ will strike the upper ends of the slots $o'$, and all the fingers will be raised simultaneously. A downwardly-hanging bar has before been used for lifting the fingers together; but that is often in the way of the dough, and it is not so compact a device as that just described. The scrap, when it reaches the top of the scrap-apron, may be removed by hand, or it can be delivered at the side of the machine and automatically discharged into a proper receptacle by means of the inclined trough P, Fig. 18. This trough has bottom and side boards, as shown, and is supported in an inclined position on standards rising from the frame A. Scrapers $p$ travel down the bottom of the trough and push the scrap to its discharge end. These scrapers are carried by belts or chains $p'$, which run over wheels $p^2$, mounted on shafts at the ends of the trough. The shaft at the lower end of the trough is connected by bevel-gears with a sprocket-wheel, which is revolved by a chain from a wheel on the shaft of the upper roller of the scrap-apron, and motion is thus transmitted to the scrapers $p$. The crackers pass under the scrap-apron to the tail end of the main apron. Here the main apron passes around the combined wedge and roller. (Shown in detail in Figs. 13 and 14.) This device is a block or frame, Q, which is pivoted at its ends in boxes $q$, sliding in slots in the main frame, and made adjustable by means of screws, in the usual manner. The block or frame Q carriers a roller, Q', on one side, and from that roller the block Q is beveled downwardly to its other side, to form a wedge, $Q^2$. The edge of the wedge is provided with a small anti-friction roller, $q'$, which turns in arms at its ends, and is supported centrally by anti-friction wheels $q^2$. The anti-friction roller $q'$ and wheels $q^2$ relieve the apron of most of the wear which it has heretofore received in passing around the wedge at the tail of the machine, and they make the apron run easier. One of the journals of the reversible block Q is extended through its box and has on its end, outside of the frame of the machine, an arm, R, by which it is reversed or adjusted. This arm is held by a clamp-bolt and thumb-nut in the curved slots $r$ of a plate, $r'$.

If the machine is to be used as a "pan-machine," the main apron runs over the wedge side of the reversible block, which wedge is adjusted to deliver the crackers into the pans on the pan-apron S; but if the machine is to be used as a "peeling-machine," the block Q is reversed and the apron runs over the roller Q', the crackers being "peeled" up from the main apron by a scoop used for that purpose. The pan-apron S runs over an operating-roller, $s$, journaled in the frame A, beneath and between the scrap-apron and cutter bed-plate. The apron S runs around another roller, $s'$, journaled in adjustable boxes in the end of a frame, T. This frame projects from the tail end of the machine, and rests, between the sides of the main frame, upon a cross-shaft, $t$, near its center, and its inner end has shoulders which engage with a cross-rod, $t'$. By pulling the frame T outward a short distance, so as to disengage it from the rod $t'$, it can be tilted above said rod and pushed into the main frame, sliding upon the shaft $t$ and rod $t'$, until it is entirely inclosed by such main frame, and is out of the way. This is done when the machine is used as a peeling-machine.

To convert the machine into a pan-machine, it is only necessary to reverse the block Q, as before explained, and to draw out the frame T until its inner end locks with the rod $t'$. When the frame is in this position, the pan-apron inclines upwardly from the roller $s$ past the wedge to the roller $s'$. The pans are placed on the pan-apron through one side of the main frame, and travel under the wedge so as to receive the crackers from the main apron. Fingers U are used, as in other pan-machines, to prevent the crackers from turning over in dropping from the wedge into the pans. These fingers are carried by a rod, U', which is pivoted to arms $u$, having hooks $u'$, which engage removably with screw-studs $u^2$ on one side of the reversible block Q. The arms $u$ are provided with set-screws $u^3$, which set down on the block Q and determine the vertical position of the fingers U. Thus these fingers can be adjusted to suit the particular adjustment of the wedge, and can be removed when the block Q is reversed.

We have found the above-described method of converting our machine from a "panner" into a "peeler," or vice versa, a convenient one; but as the most important feature of our invention consists in making a machine that can be readily converted from one form into the other by means of a movable frame, we do not wish to restrict ourselves to the exact forms or details of construction herein described.

What we claim as our invention is—

1. In a cracker-machine, the combination, with the dough-rollers, of the cog-wheel $d$, the removable gear-wheel $d^2$, and the intermediate adjustable gear-wheel, $d'$, mounted in swinging arms D D', sleeved on the shaft on opposite sides of the cog-wheel $d$, whereby the size of the removable gear-wheel $d^2$ can be readily changed to change the speed of the dough-rollers, substantially as described and shown.

2. In a cracker-machine, the combination, with the dough-rollers, of the cog-wheel $d$, on the shaft of the lower roller, the removable gear-wheel $d^2$, and the intermediate adjustable gear-wheel, $d'$, mounted on swinging arms D D', one of which is provided with a lifting-handle, $e$, and the slotted plate $e'$, and locking-bolt turned by handle $e^2$, substantially as described and shown.

3. In a cracker-machine, the combination, with the main apron, having an intermittent movement, of a brake for preventing the travel of such apron beyond the point to which it is moved by the operating devices, substantially as described and shown.

4. In a cracker-machine, the combination, with the main apron E, and the apron-roller $f$, revolved by a pawl-and-ratchet connection with a reciprocating rod, of the brake-lever G', pressed by a spring against such roller, and a nut for adjusting the pressure of such spring, substantially as described and shown.

5. In a cracker-machine, the combination, with the traveling apron, of the scraper and spout J, made in one piece and situated beneath the upper part of such apron in front of the cutter bed-plate, for scraping the dough from the apron before it passes under the cutters, substantially as described and shown.

6. In a cracker-machine, the combination of the driving-shaft C, having the two eccentrics $j'$ on its ends, with the horizontal levers $K^2$ $K^3$, and connecting-arms $j$, and rods $i'$ $i^2$, for operating the cutter cross-head K, and the pitman $j^2$, connected with a wrist-pin on one of the eccentrics $j'$, swinging block G, shaft $k$, block $k'$, and rods F, $j^3$, and $k^3$, for working the aprons through pawls and ratchets, substantially as described and shown.

7. In a cracker-machine, the combination, with the reciprocating cutters and traveling apron, of the bed-plate, a supporting-plate resting in a fixed position upon the frame of the machine below such bed-plate, an intermediate turn-table having inclines, and a worm-shaft extending transversely across the frame and operating said turn-table, substantially as and for the purpose set forth.

8. In a cracker-machine, the combination, with the bed-plate L, of the turn-table L', having inclines $l$ and teeth $m$, the supporting-plate $L^2$, provided with inclines $l^2$, and the worm-shaft M, substantially as described and shown.

9. In a cracker-machine, the fingers O, which expel the crackers from the scrap, pivoted on a turning bar, O', and having slots $o'$ in their inner ends, in combination with pins $o$ on the said bar for raising the fingers simultaneously, substantially as described and shown.

10. In a cracker-machine, the combination, with the scrap-apron, of the inclined trough P, arranged across the frame under the upper end of such scrap-apron, and scrapers traveling in the bottom of said trough, substantially as described and shown.

11. In a cracker-machine, the combination, with the scrap-apron, of the inclined transverse trough P, having sides and bottom, the endless belts or chains $p'$, the wheels $p^2$ at the ends of such trough, and the scrapers $p$, carried by such belts or chains, substantially as described and shown.

12. In a cracker-machine, the combination, with the main apron, of a reversible block at the tail end of the same, carrying an apron-roller and a wedge, and adapted to be reversed so as to present either to the traveling apron, for the purpose of making the machine convertible from a pan to a peeling machine, or vice versa, substantially as described.

13. In a cracker-machine, the combination of a stationary frame and a movable frame, each provided with an apron, the two frames being constructed, substantially as shown, so that the movable frame may be pushed into the stationary frame or drawn out therefrom, whereby the machine can be readily converted from a panner into a peeler, or vice versa, substantially as described.

14. In a cracker-machine, the combination, with the main apron, of the reversible wedge and roller at the tail end of the same, and the pan-apron carried by a sliding frame, substantially as and for the purpose set forth.

15. In a cracker-machine, the combination, with the main apron, of the wedge $Q^2$ at the tail end of the same, the roller $q'$ on the end of the wedge, journaled in arms at its ends, and supported by intermediate wheels, $q^2$, substantially as described and shown.

16. In a cracker-machine, the combination, with the main apron, of the reversible roller and wedge-block Q, the arm R, for moving the same, and the securing-plate $r'$, having slots $r$, substantially as described and shown.

17. In a cracker-machine, the combination, with the main apron and reversible roller and wedge-block Q, of the fingers U, hung on a rod, U', having hook-arms $u$, for engaging with studs $u^2$ on the reversible block, and set-screws $u^3$, for adjusting the position of such fingers, substantially as described and shown.

18. In a cracker-machine, the pan-apron S, extending over an operating-roller, $s$, journaled in stationary bearings, in combination with the frame T, sliding over such stationary operating-roller, and having a roller, $s'$, for carrying the other end of the apron, substantially as described and shown.

19. In a cracker-machine, the pan-apron S and stationary operating-roller $s$, in combination with the sliding frame T, having apron-roller $s'$, the supporting-shaft $t$, and locking-rod $t'$, substantially as described and shown.

JACOB ROTH.
MARTIN DE TAMBEL.

Witnesses:
F. W. KASEHAGEN,
OLIVER W. MARBLE.